April 2, 1957 A. J. TORRE 2,787,725
PROTECTION APPARATUS
Filed Oct. 5, 1955
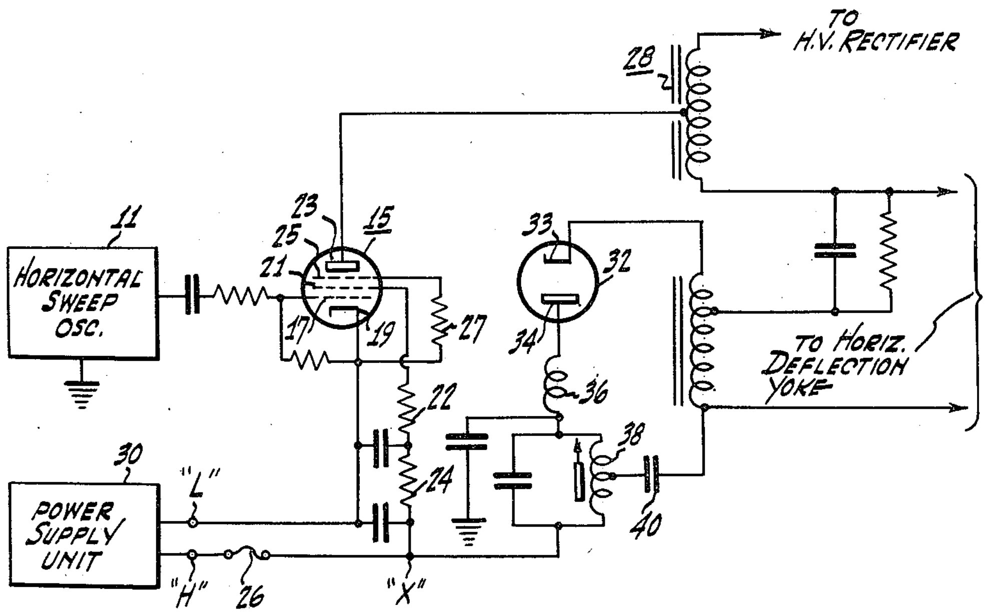
INVENTOR.
ALTON J. TORRE
BY Olin V. Mitchell
ATTORNEY United States Patent Office 2,787,725

Patented Apr. 2, 1957

2,787,725

PROTECTION APPARATUS

Alton John Torre, Woodbury, N. J., assignor to Radio Corporation of America, a corporation of Delaware Application October 5, 1955, Serial No. 538,561

4 Claims. (Cl. 315—20)

The present invention relates generally to protection apparatus, and more particularly to fuse protection apparatus for television receivers and the like.

In the usual television receiver, provided with a low voltage power supply unit, it is customary to provide a fuse in connections from the power supply unit to one or both of the respective deflection wave output tubes of the receiver. For conventional apparatus protection purposes, it is intended that this fuse vaporize when an excessive current is drawn therethrough from the power supply unit. However, it has been observed that a common cause for the "blowing" of this fuse in a television receiver is the existence of a momentary internal sputtering or short between certain deflection output tube electrodes, particularly between the deflection output tube's suppressor grid and the anode or screen grid. While a variety of causes, such as the lodging of lint or other foreign particles between the adjacent electrodes, may engender such internal sputtering, the internal short is usually brief in duration, self-quenching, and results in little or no damage to the tube structure. However, though the fault is thus usually self-correcting, it results, in the conventional receiver, in vaporization of the protective fuse, and the receiver is thereby rendered inoperative until replacement of the fuse is effected. It is known that such fuse failure represents the cause for a large percentage of service calls in the servicing of television receivers, and such fuse replacement is a major component replacement in receiver servicing.

It is a particular purpose of the present invention to provide means for substantially preventing the vaporization of the protecting fuse when such momentary internal shorts comprise the existing fault.

In accordance with an embodiment of the present invention, the prevention is effected by providing a current-limiting resistor in the connection of the suppressor grid to the cathode or other reference potential point. It will be appreciated that by limiting the surge current caused by the momentary internal shorts in this manner, the desired fuse protection is achieved without the sacrifice of B+ voltage and power that would result if it was rather sought to effect such current limiting by a resistor in the plate and/or screen grid supply leads.

It is thus an object of the present invention to provide means for limiting surge currents resulting from internal suppressor-screen or suppressor-anode shorts in a vacuum tube without sacrifice of B+ voltage or power.

It is also an object of the present invention to provide a novel fuse protection circuit for television receivers and the like whereby unnecessary vaporization of a protecting fuse due to momentary internal shorts is substantially precluded without reduction of the applicable B+ voltage and without costly power dissipation.

The drawing illustrates in block and schematic form a portion of a television receiver embodying the principles of the present invention.

In the drawing, only a portion of the horizontal deflection circuitry of a television receiver has been particularly illustrated to demonstrate application of an embodiment of the present invention. Additional details of the horizontal deflection circuitry, and the balance of the receiver components, may, for example, accord with the schematic details of the RCA 21-CT-661U type color television receiver illustrated in the RCA Victor Service Data pamphlet designated "1955 No. T5."

In the receiver segment illustrated in the drawing, a horizontal sweep oscillator 11 supplies deflection waves to the control grid 17 of a horizontal output tube 15. The cathode 19 of the output tube 15 is connected to a low potential terminal L of the receiver's ("low voltage") power supply unit 30. The output tube's screen grid 21 is connected via series resistors 22 and 24 to a junction point X, a current overload responsive fuse 26 connecting junction point X to a high potential terminal H of the power supply unit 30. The horizontal scanning wave output of tube 15 is delivered from the tube's anode 23 to the horizontal windings of the receiver's deflection yoke (not illustrated) via a horizontal output transformer 28, which is illustrated as taking a well known autotransformer form.

Associated with the horizontal output transformer 28 is a damper diode 32 of conventional function, the damper diode anode 34 being connected via series inductances 36 and 38 (latter serving as a horizontal linearity control) to the previously mentioned junction point X, and thence via the fuse 26 to the high potential terminal H of the supply 30. Connections are made from an intermediate point on the horizontal output transformer 28 to the damper diode cathode, and from the low potential extremity of the output transformer 28 to the damper diode anode 34 via a capacitor 40, a portion of the inductance 38, and the inductance 36. It will be appreciated that the arrangement illustrated embodies the well-known B-boost principles, whereby the output tube anode 23 is supplied with a boosted B+ potential, i. e. the supply potential appearing at terminal H, augmented by the charge developed across capacitor 40 in response to the periodic conduction of damper diode 32.

It may now be observed that in accordance with the principles of the present invention the suppressor grid 25 of output tube 15 is connected via an external resistor 27 to the output tube cathode 19, rather than being internally shorted thereto as has been heretofore conventional. Under normal conditions, with the suppressor grid drawing no current, the incorporation of resistor 27 does not adversely affect the desired maintenance of the suppressor grid 25 at cathode potential.

To appreciate the fuse protection advantages of the use of the present invention, it may first be assumed that resistor 27 and its illustrated external connection have not been provided, and the suppressor grid 25 is rather internally shorted to a cathode 19 as has been heretofore conventional. When, under these conditions, internal sputtering occurs, for one reason or another, between the suppressor grid 25 (at cathode potential) and the adjacent screen grid 21 or plate 23 (at respectively high positive potentials), it will be seen that junction point X will be effectively shorted to terminal L, and an excessively high current wil be drawn through the fuse 26, causing its vaporization and thus disabling the receiver, though the internal short in tube 15 is but momentary and non-damaging.

However, by providing the illustrated external connection of the suppressor grid 25 to cathode 19 via a resistor 27 of suitable magnitude, the impedance presented between junction point X and terminal L when such internal sputtering occurs may be made sufficiently high to limit the magnitude of the momentary surge of current to a value tolerated by the protecting fuse 26. When the transitory internal sputtering ceases, the supply connection through fuse 26 is still intact and the receiver continues in operation.

It will be observed that no power is dissipated by the resistor 27 (other than during the momentary shorts themselves) since there is normally no current in the suppressor-cathode connection. It may similarly be observed that the incorporation of the resistor 27 in the suppressor lead in no way reduces the B+ potential normally available for application to the output tube's plate or screen grid. It will be recognized that these advantages would not be present if it was otherwise sought to effect the surge current limiting in the supply connections to plate and screen grid. It may thus be observed that the present invention provides a relatively simple and economical system for preventing unnecessary vaporization of a protecting fuse in a television receiver without sacrificing supply potential and without waste of power.

To give a particular working example, a suitable resistance value for the resistor 27 may be 470 ohms for use of the invention in a receiver of the aforementioned 21-CT-661U type, under conditions where fuse 26 has a .45 ampere current rating; where the supply potentials at terminals H and L are approximately +380 volts and −20 volts, respectively; where the horizontal output tube 15 is a type 6CB5 pentode modified to eliminate the internal suppressor-cathode connection; and where the values of the other illustrated circuit elements are those indicated in the aforementioned service data pamphlet.

Having thus described the invention, what is claimed is:

1. In a television receiver including a power supply unit, a deflection wave source, and deflection wave utilization apparatus, the combination comprising an electron discharge device comprising a cathode, an anode, a control grid, and a suppressor grid, means for applying deflection waves from said source to said control grid, means for connecting said cathode to a low potential terminal of said power supply unit, said electron discharge device having an output circuit coupling said anode to said deflection wave utilization apparatus, said output circuit comprising means including a current overload responsive fuse for connecting said anode to a high potential terminal of said power supply unit, and means for connecting said suppressor grid to said cathode, said last-named connecting means including a resistor, the resistance of said resistor being sufficiently high to limit the current drawn from said power supply unit through said fuse by said anode during the existence of an internal short between said anode and said suppressor grid to a value less than the maximum current rating of said fuse.

2. A combination in accordance with claim 1 wherein said electron discharge device also includes a screen grid, wherein means are provided for connecting said screen grid to said high potential terminal of said power supply unit through said fuse, and wherein the resistance of said resistor is also sufficiently high that current drawn from said power supply unit through said fuse by said screen grid during the existence of an internal short between said screen grid and said suppressor grid does not exceed the maximum current rating of said fuse.

3. In a television receiver including a power supply unit and a deflection wave source, the combination comprising an electron discharge device including a cathode, an anode, a control grid, and a suppressor grid, means for connecting said cathode to a low potential terminal of said power supply unit, an input circuit connected between said control grid and said cathode, said input circuit being coupled to said deflection wave source, an output circuit connecting said anode to a high potential terminal of said power supply unit and including a current overload responsive fuse, means for connecting said suppressor grid to said cathode, and means for preventing the overloading of said fuse by shorts between said anode and said suppressor grid, said overload prevention means comprising a current limiting resistor included in said suppressor grid-to-cathode connecting means.

4. In a television receiver including a power supply unit, a deflection wave source, and deflection wave utilization apparatus, the combination comprising an electron discharge device including a cathode, an anode, a control grid, a suppressor grid, and a screen grid, means for connecting said cathode to a low potential terminal of said power supply unit, an input circuit connected between said control grid and said cathode, said input circuit being coupled to said deflection wave source, an output circuit coupled to said deflection wave utilization apparatus, said output circuit connecting said anode to a high potential terminal of said power supply unit and including a current overload responsive fuse, means for connecting said screen grid to said high potential terminal of said power supply unit via said fuse, and means for preventing the overloading of said fuse by momentary sputtering between one of said anode and screen grid electrodes and said suppressor grid, said overload prevention means comprising a current limiting resistor connected between said suppressor grid and said cathode.

No references cited.